United States Patent
Kulack

(12) 
(10) Patent No.: US 6,877,987 B2
(45) Date of Patent: Apr. 12, 2005

(54) PERVASIVE EDUCATIONAL ASSISTANT AND STUDY AID FOR STUDENTS

(75) Inventor: Frederick Allyn Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 10/039,301

(22) Filed: Jan. 2, 2002

(65) Prior Publication Data

US 2003/0124493 A1 Jul. 3, 2003

(51) Int. Cl.[7] .............................................. G09B 19/00
(52) U.S. Cl. ...................... 434/118; 434/322; 434/350; 705/9
(58) Field of Search ............................... 434/118, 322, 434/350; 705/9; 340/825.49

(56) References Cited

U.S. PATENT DOCUMENTS

| | | | |
|---|---|---|---|
| 5,601,432 A | * | 2/1997 | Bergman .................... 434/118 |
| 6,347,333 B2 | * | 2/2002 | Eisendrath et al. ......... 709/217 |
| 6,353,447 B1 | * | 3/2002 | Truluck et al. ............. 345/733 |
| 6,370,355 B1 | * | 4/2002 | Ceretta et al. .............. 434/350 |
| 6,427,063 B1 | * | 7/2002 | Cook et al. .................. 434/350 |
| 6,549,939 B1 | * | 4/2003 | Ford et al. ................... 709/217 |
| 6,611,673 B1 | * | 8/2003 | Bayley et al. ............. 340/10.3 |
| 6,633,223 B1 | * | 10/2003 | Schenker et al. .......... 340/5.53 |
| 6,661,335 B1 | * | 12/2003 | Seal ........................... 340/10.1 |
| 6,711,378 B2 | * | 3/2004 | Kashima ..................... 434/350 |
| 6,732,080 B1 | * | 5/2004 | Blants ............................ 705/9 |
| 6,774,811 B2 | * | 8/2004 | Kaufman et al. ...... 340/825.49 |

FOREIGN PATENT DOCUMENTS

FR 002677148 A1 * 12/1992 ........... G06F/15/21

\* cited by examiner

Primary Examiner—Xuan M. Thai
Assistant Examiner—Cameron Saadat
(74) Attorney, Agent, or Firm—Wood, Herron & Evans, LLP

(57) ABSTRACT

A portable organizer device through which a student may use and maintain a personal calender. Further, a student may use the portable organizer to access assignment records maintained in a master calender used and maintained by an educational institution in a database, and synchronize the personal calendar with the master calender. The portable organizer may be further configured to facilitate the management of student equipment and activities.

19 Claims, 6 Drawing Sheets

PERVASIVE EDUCATIONAL ASSISTANT AND STUDY AID FOR STUDENTS

FIELD OF THE INVENTION

The present invention relates to personal time management devices. More specifically, the present invention relates to a personal management device for students.

BACKGROUND OF THE INVENTION

Today people engage in a multitude of activities. Students are no different. Students are enrolled in a variety of academic subjects and are eligible to participate in a host of extracurricular activities. For example, students may attend classes in English, economics, chemistry, and mathematics, to name but a few. In addition, students may, based on personal interests, participate in extracurricular activities such as gymnastics, basketball, football, or musical instrument performances. As a result, students often have difficulty managing the homework, project and study requirements for classes in conjunction with extracurricular activities.

Students not only must remember to be in the right place at the right time, they must also remember to bring the appropriate equipment for each activity. Some students have turned to personal digital assistants (PDAs) to help them be in the right place at the right time and to help them remember to bring the appropriate equipment.

PDAs contain microprocessors that are dedicated to specific applications such as personal schedulers and address books. Cellular telephones, internet enabled pagers, and other similar devices often contain microprocessors with similar dedicated applications.

As mentioned, PDAs typically contain an application with a personal calendar with traditional scheduling and reminder capability. It may also be possible to store additional information, such as addresses, telephone numbers and e-mail addresses in an associated address book application. Certain devices may even allow synchronization with a calendar application maintained on a personal computer (PC).

While useful, these PDA devices are not well tailored to use by students and the particular demands of student life. Therefore, a need exists for a device that can be used by students to assist in time and resource management for educational tasks further providing scheduling with educational institutions and inventory functions.

SUMMARY OF THE INVENTION

In accordance with a first aspect of the present invention, this need is met by a portable organizer device which is configured to access assignments and create calendar entries for those assignments based upon user-specified schedule constraints.

In accordance with a second aspect of the present invention, a portable organizer device is configured for use with identification tags which emit wireless identification signals. The organizer is configured to notify a user of equipment needs and identify equipment from tags.

In accordance with a third aspect of the present invention, the portable organizer device manages calendar entries and assignments based upon difficulty and student capability, and monitors assignment completion times to adjust stored difficulty and student capability information.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

In the preceding discussion, and in the following explanation of the invention, a "device" refers to a wireless device similar in form to a personal digital assistant (PDA). As will be seen, such devices include a screen, and may be used for user input and interaction. The term "student" refers to any person using a device to assist in scheduling, planning, and time management as it relates to a master schedule and detailed assignment information dictated by an educational institution. The term "equipment" refers to any real objects required to complete certain tasks required by the education institution. These typically include, but are not limited to, books, learning devices, scientific calculators, lab equipment, and sports equipment. The term "educational institution" refers to an institution responsible for dictating class content, as well as class, quiz, and test schedules, for students. An educational institution also recommends or requires "equipment" for particular classes and/or activities.

A "server" is a computer acting as a common repository for information specific to the classes, lectures, or other activities provide by an educational institution, such as educational curriculum, time and equipment recommended by the educational institution. As previously mentioned, an identification (ID) tag is a piece of miniature wireless equipment that may be attached to a piece of equipment. The term "master calender" will be understood to comprise calendar information retrieved from the server that represents scheduling information dictated by the educational institution, such as class times, quiz and test schedules, assignment schedules, complexity, preparation time required, equipment required, etc. Furthermore, a "personal calender" will be understood to comprise a student's calender entries based on the master calender and student preference information, such as relative student skill, favorable study times, etc.

Figure 1:
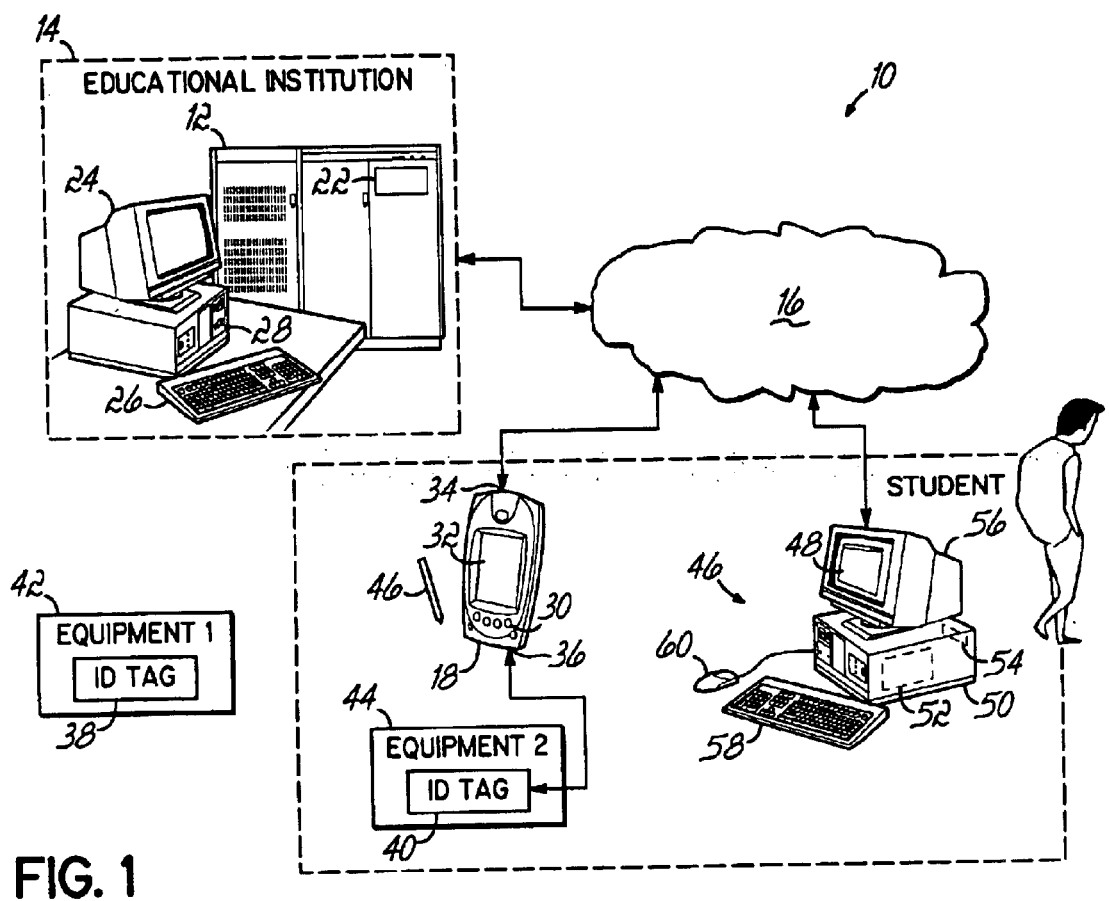
FIG. 1 is an illustration of a networked computer system including a server and student hardware in an embodiment of the present invention in an educational setting.

Referring now to FIG. 1, a networked computer environment 10 consistent with principles of the present invention can be explored. A server 12 within an educational institution 14 is connected to a network 16, such as the Internet, for communication with each of a plurality of heterogenous students devices, such as that typified by device 18 used by student 20. The device 18 may resemble a PDA and may be inserted into a student backpack.

The essential functional elements of server 12 are illustrated in FIG. 1. Specifically, server 12 includes a mass storage device 22 for storage of information during operation of server 12. Server 12 further includes a display 24 and a keyboard 26 used in interacting with the server 12. The server 12 also includes a communication interface 28 for connecting to network 14.

Figure 2:
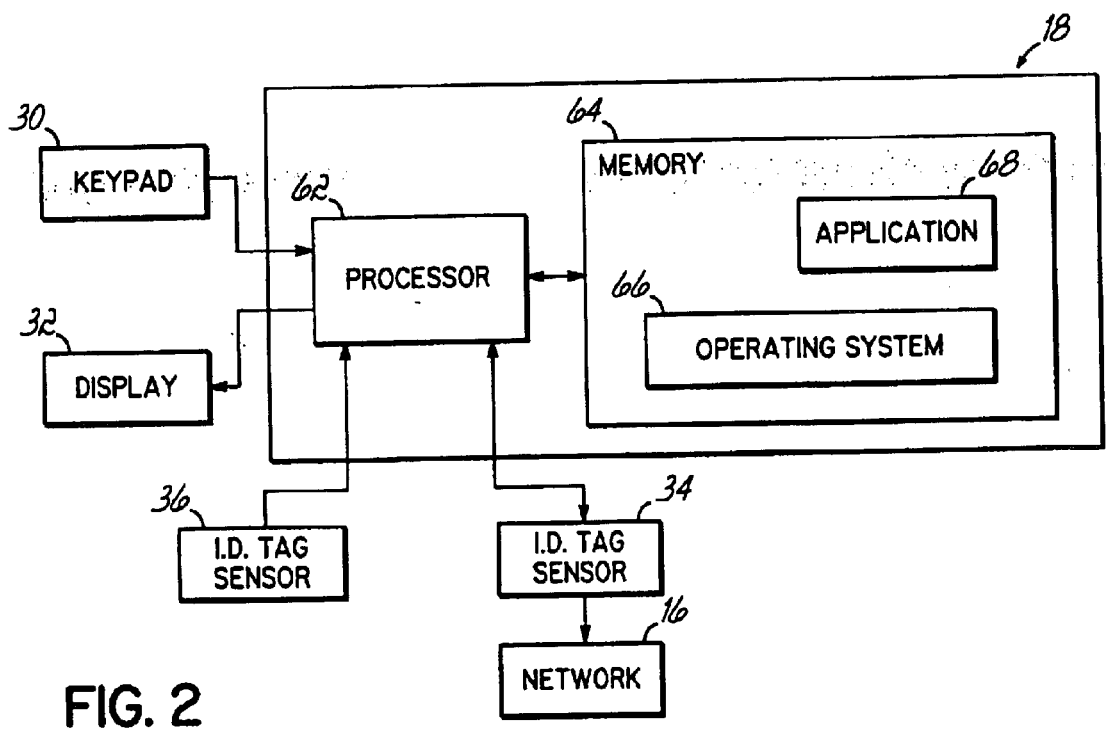
FIG. 2 is a block diagram of the student personal computer of FIG. 1.

As also seen in FIGS. 1 and 2, a typical student device 18 includes a keypad 30 and a display 32 for interacting with a student. The typical device will also include a communication interface 34 for exchanging data with a server, such as server 12 in educational institution 14 over a network, such as network 16. The device will also have an ID tag sensor 36 for detecting the absence or presence of ID tags 38, 40 attached to various equipment 42, 44. The form of keypad 30 and display 32 may vary widely depending on the construction of the device 18. However, a typical device will include at least a keypad, a display, a communication interface, and an ID tag sensor. In addition, device 18 may also include a pointing device 46 further facilitating student interaction.

As configured, device 18 is operable using ID tag sensor 36 to sense the absence or presence of ID tags attached to various pieces of student equipment and thereby whether or not a student has a particular piece of equipment. For example, as depicted in FIG. 1, device 18 using ID tag sensor 36 is not able to sense the presence of ID tag 38 associated with equipment 1 (42). Therefore, as shown, the student 20 would not have equipment 1 in their immediate possession. However, device 18 is able to sense that ID tag 40 and therefore equipment 2 (44) is currently within the immediate possession of the student 20.

Systems have been developed to manage equipment, typically in the context of a fiscal inventory. For example, a factory or manufacturing facility may need to know how many production machines of a certain type are in use for tax purposes. Similarly, an education institution, such as a college, may want to know how many PCs and printers are located in various computer labs throughout campus.

This type of inventory is typically performed by placing an identification (ID) tag on each piece of equipment as it is placed into service. In a wireless inventory system, each ID tag contains a piece of miniature wireless equipment. A device may then be passed by each ID tag, thereby sensing a wireless transmission from the ID tag, to inventory the equipment to which ID tags are attached. In the factory example above, a sensing device may be taken around the production area to inventory the machinery. Or, in the educational example, a person may take a sensing device to every computer lab on campus.

These ID tags are also used to enhance retail store security. For example, in this type of application, a tag might be attached to expensive goods, such as sweaters or jeans, in a retail store. Goods that are easily shoplifted many also have ID tags attached to them. Then, when a person presents the good with the ID tag to the cashier for purchase, the ID tag is removed. However, if the person attempts to steal the item, a sensing device positioned at the exit of the store senses the item with the ID tag attached to it being taken from the store and sounds an alarm. Thus, tags may be used to sense the presence or absence of an item.

Alternatively, and as also shown, a student may provide a website which the device may be interfaced with. For example, a student 20 may have a personal computer 46 which hosts a website 48. Personal computer 46 may include a processor 50 for executing code, a memory 52 for storage of information, and a communications interface 54 for connecting to network 16. Personal computer 20 further includes a display 56, a keyboard 58, and a mouse 60 used in maintaining website 48.

Turning now to FIG. 2, the typical device 18 will also include a processor 62 for processing data. The form of the processor will also vary depending upon the construction of the device. A device 18 will further include a memory 64 for storing data and program code used by the processor 62 in performing functions for the student. The memory 64 will typically include an operating system 66 and an application 68 defining general operations available to students.

Figure 3:
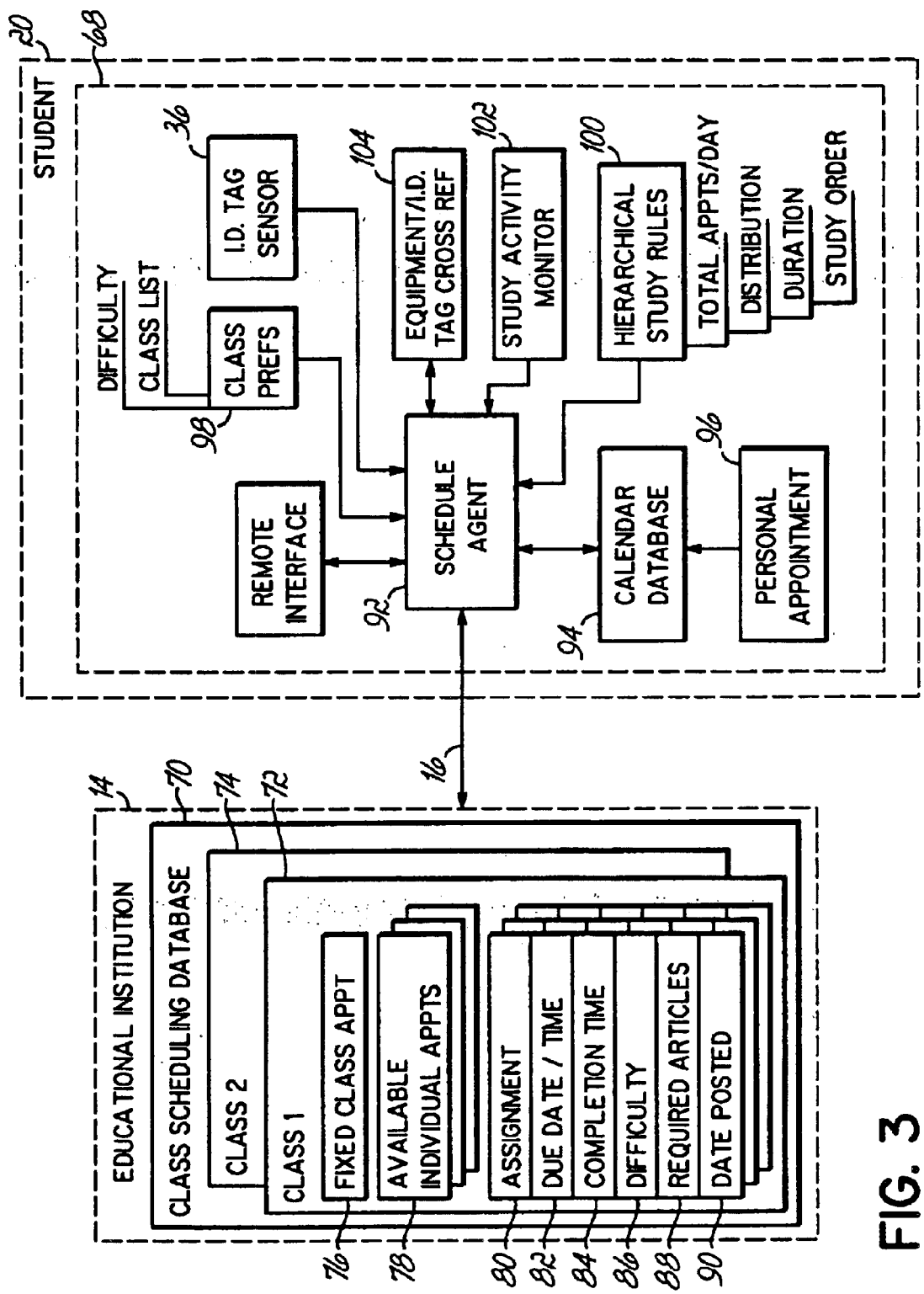
FIG. 3 illustrates the activities of a server such as that shown in FIG. 1 interacting with an application in a device such as that shown in FIGS. 1 and 2.

Turning now to FIG. 3, an illustration of the activities of a server, such as the server 12 in educational institution 14, carrying out master calender principles of the present invention can be explained. The mass storage device 22 of server 12 is configured with a database, such as class scheduling database 70, as is well known in the art. An educational institution, through the database, provides information such as class name, class number, class teacher, class meeting schedules, class assignment schedules, due dates, the estimated difficulty of and/or amount of time required for assignments, test schedules, estimates of test ranking, i.e., quiz, chapter test, midterm test, final test, etc. For example, educational institution 14, through the class scheduling database 70 provides information for two classes, class 1 (72) and class 2 (74).

As shown in class 1 (72), available fields for classes in the class scheduling database 70 are: a fixed class appointment 76, a plurality of available individual appointments 78, and a plurality of assignments 80, each containing a due data and time 82, an estimated completion time 84, a degree of difficulty 86, required articles 88, and a posting date for the assignment 90.

FIG. 3 also contains an illustration of the activities of an application within a device, such as application 68 within device 18 owned by student 20, carrying out personal calender principles of the present invention. As shown, application 68 contains a schedule agent 92 for coordinating master calender functionality with personal calender functionality offered in device 18. As further shown, application 68 accesses educational institution 14 through network 16. This allows the schedule agent 92 to download information about the classes that student 20 is enrolled in into a calendar database 94 containing a personal calendar.

The personal calendar may resemble a calendar on a pervasive device. It contains typical calendar information for student activities. Student work schedules, sleep/wake habits, meetings, appointments, etc. can be entered into the personal calender using personal appointment 96 input functionality. Thus, the personal calender can be maintained internal to the device 18, as mentioned, or external via a website provided by the student 20, such as through a personal computer 46 discussed in conjunction with FIG. 1.

The application 68 also allows a student 20 to enter preferences into the device 18. Preference information may include: the address of the educational institution provider server used for schedule/class information, which classes a student prefers attending, and the equipment associated with each class, e.g., physics 101 associated equipment consists of a scientific calculator, a physics book, and a physics workbook, all of which have ID tags attached to them. Preference information may also include preferences for study habits. For example, a student may find that they need a certain number of minutes of study time for each rating level or rank of difficulty that assignments have. Another example is that for each level of importance or difficulty for a test, the student may prefer to study a given number of minutes or a given number of days before the test. A student might also prefer to schedule a certain amount of time between study sessions or other activities. Reminder preferences may also be included. A student may wish to schedule a time interval for checking equipment and the study history. There may also be preferences for the types of alarms and reminders a student receives.

For example, application 68 allows a student 20 to enter class preferences 98. The class preferences 98 allow the student 20 to enter a degree of difficulty for various classes and maintain a class list. However, other class preferences are possible without departing from the spirit of the invention.

Student 20 may also enter hierarchical study rules 100. As illustrated, fields are available for preferences for total appointments per day, distribution of study periods, duration of study periods, and a study order. However, other applications may allow students to establish a variety of other hierarchical study rules.

A study activity monitor 102 may also be provided, as is further illustrated. A study activity monitor allows a student 20 to track the completion of assignments 80, as well as other scheduled activities.

As previously discussed in conjunction with FIGS. 1 and 2, FIG. 3 illustrates an ID tag sensor 36 for detecting the absence or presence of ID tags attached to various equipment. Students apply ID tags to equipment such as books, calculators, sporting goods, musical instruments, etc. These ID tags uniquely identify each piece of equipment, allowing the device 18 to actively inventory each piece of equipment. Equipment/ID tag cross reference 104 allows students when first applying ID tags to equipment to associate a particular ID tag with a particular piece of equipment.

For example, referring also to FIG. 1, student 20 using the equipment/ID tag cross reference 104 function in application 68 might scan an ID tag 40 with ID tag sensor 36. Student 20 then applies ID tag 40 to piece of equipment 2 (44). The student then enters a description for piece of equipment 2 (44), e.g., scientific calculator, into the device 18. Now whenever device 18 senses the wireless signature of ID tag 40, the device will associate that ID tag with a scientific calculator.

Figure 4:
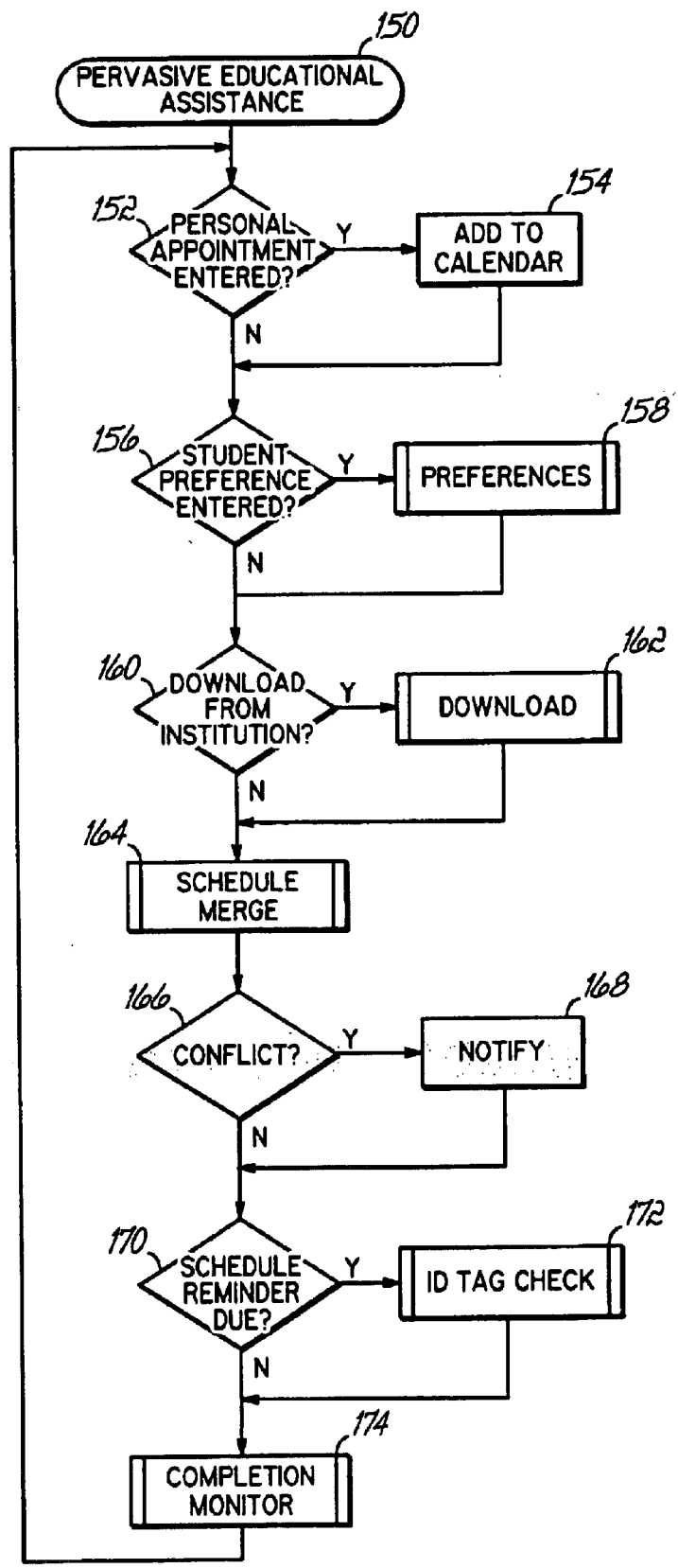
FIG. 4 is a flow chart illustrating activities of a device such as that shown in FIGS. 1, 2, and 3 in accordance with principles of the present invention.

Turning now to FIG. 4, a flow chart for a pervasive educational assistance application executed by a device, such as device 18 is shown. The execution of the pervasive educational assistance application 150 begins at step 152 wherein a student is queried on entering a personal appointment. If the student wishes to enter a personal appointment, the appointment is added to a calender, such as the personal calender in calendar database 94, in step 154. Once the appointment is entered, or if the student does not wish to enter an appointment, the application proceeds to step 156.

In step 156 the student is queried on entering a preference. If the student wishes to enter a preference, the application enters a subroutine for entering preferences in step 158. Such a preferences subroutine wherein a student may enter various parameters will be readily apparent to one of ordinary skill in the art. Such a subroutine may include personal calendar entries and sleep/wakes times not managed by the device, relative skill level of the student compared to the average student, class preferences, as well as preferences for study habits, etc., as was mentioned hereinbefore. As discussed, preferences for study habits, or hierarchical study rules, are wide and varied.

Hierarchical study rules may include preferable study times, a preference for studying one day before a specific event rather than one week before that event, a preference for studying early in the week rather than spreading studying out through the week, minimum and maximum study goals, and/or a preference for recurring study times for particular classes. One skilled in the art may also recognize additional preferences and may add such additional preferences to the subroutine without departing from the spirit of the invention.

Once any preferences have been entered, or if the student does not wish to enter any preferences, the application proceeds to step 160. In step 160, a student may download information from an educational institution, such as an education institution 14. Routines for downloading information over the internet, such as through web sites, are well known in the art.

Alternatively, downloads from an institution could be controlled based on student preferences. In such an embodiment, downloads from an institution could occur intermittently and automatically, the frequency of which is controlled by a preference, such that student interaction would not be required. A device would then adjust the personal calender appropriately, for example, notifying a student of class cancellations and/or assignment changes.

Once the download is complete, or if the student does not wish to download, the application proceeds to the schedule merge subroutine in step 164. The schedule merge subroutine functions to reconcile differences between an educational institution and a student. For example, the schedule merge subroutine might reconcile differences between a master calender used and maintained by an educational institution and a personal calendar used and maintained by a student. An example of a schedule merge subroutine will be provided hereinafter in FIG. 5. Irreconcilable conflicts are return from the subroutine in step 166.

If the schedule merge subroutine identifies a conflict between the schedules, the student is notified of the conflict in step 168. The notification gives a student an opportunity to take additional measures outside the schedule merge subroutine to prevent the conflict from occurring.

Notifications may be as immediate as an audible alarm to the student, or as innocuous as a slightly shaded area on a user interface, such as a graphical user interface (GUI). A user interface may also provide an area wherein a user may view any existing notifications or alerts, as will be seen hereinafter.

Once the student has been notified, or if the schedule merge subroutine does not return any conflicts, the application proceeds to step 170. In step 170 the application queries a calendar data base, such as calendar database 94, for upcoming scheduled events. If a scheduled event is about to occur, the application proceeds to an ID tag check subroutine in step 172. The ID tag subroutine senses the ID tags and facilitates the collection of equipment necessary for the scheduled event that is about to occur. Further, the ID tag check subroutine facilitates the student discarding any equipment that is not necessary for an upcoming event. An example of an ID tag check subroutine will be provided hereinafter in FIG. 6. Once the ID tag subroutine has been completed, or if a schedule reminder is not due, the application proceeds to step 174.

In step 174, the application executes a completion monitor subroutine. The completion monitor subroutine allows a student to manage activities in the calender database. An example of a completion monitor subroutine will be provided hereinafter in FIG. 7. Once the completion monitor subroutine is executed, the process loops back to step 152.

Figure 5:
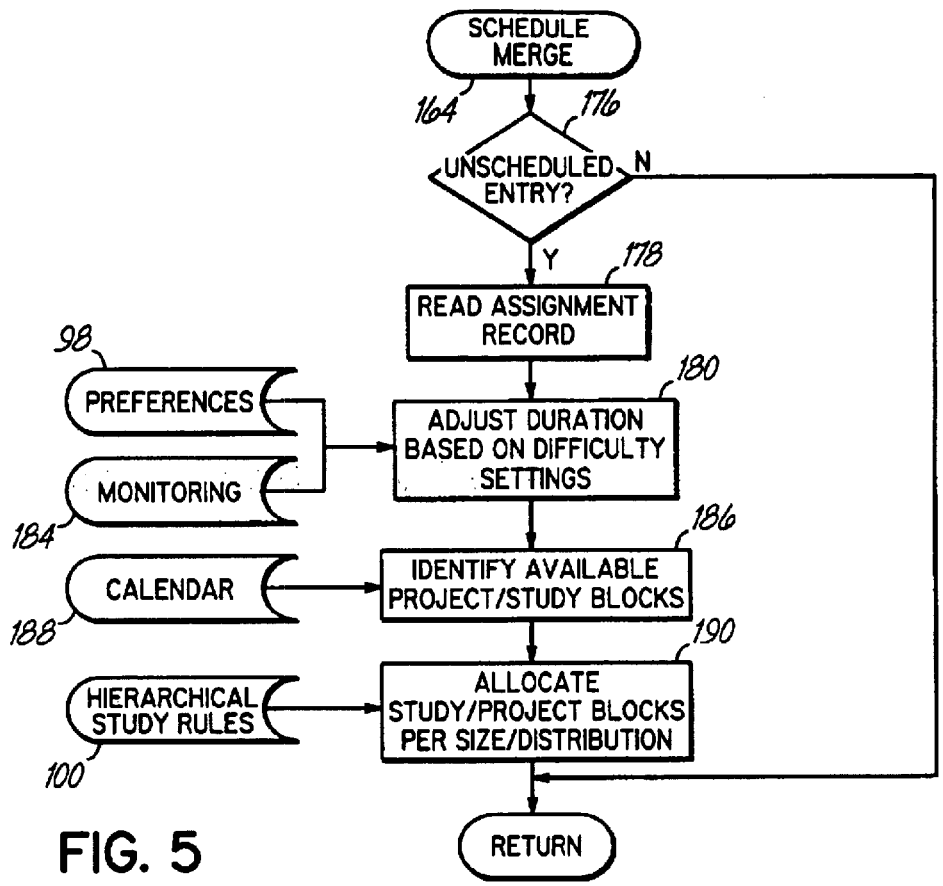
FIG. 5 is a flow chart illustrating the activities of an exemplary schedule merge subroutine, such as that used in the flow chart of FIG. 4.

Turning now to FIG. 5, an exemplary schedule merge subroutine is illustrated. The schedule merge subroutine 164 begins by determining whether entries in a master calendar have been previously reconciled with the personal schedule in the calendar database in the device. For instance, if an entry had been reconciled, the entry would have added to a calendar database, such as calendar database 94 and scheduled, and control would be passed back to the application. However, if the entry was not reconciled and unscheduled, the subroutine would proceed to step 178.

In step 178, the assignment record associated with the unscheduled entry is read. In step 180, the duration of the assignment is adjusted based on preferences 98 previously entered by the student. As is shown, monitoring 184 may also be used to adjust the duration of the assignment. Monitoring allows a student to track the completion times of previous assignments and adjust the time allotted for future assignments based on that history. Such a history would also be stored in memory within a device.

Once a duration for an assignment has been determined, the subroutine 164 proceeds to step 186. In step 186, time periods, or blocks, available in a calender, such as a personal calender, for the assignment are identified. Such periods of time may be referred to as study or project blocks, as is illustrated. After the study/project blocks have been identified, the blocks are allocated in step 190 based on hierarchical study rules previously enter by a student and the subroutine returns processing control.

Figure 6:
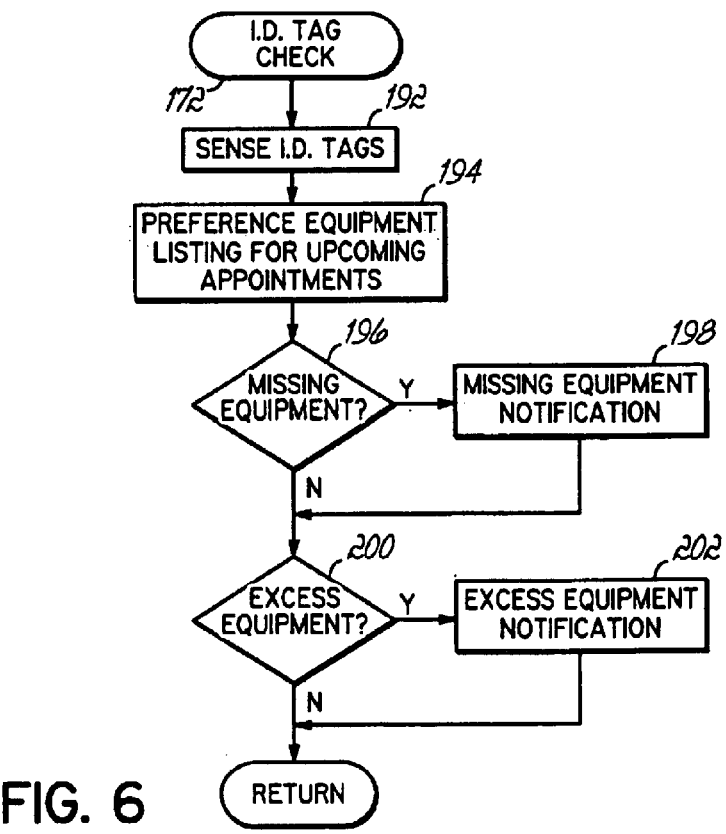
FIG. 6 is a flow chart illustrating the activities of an exemplary ID tag check subroutine, such as that used in the flow chart of FIG. 4.

Turning now to FIG. 6, an exemplary ID tag check subroutine is illustrated. The ID tag check subroutine 172 begins by sensing the ID tags, and thereby the equipment the ID tags are attached to, in step 192. Thus, a device is able to determine which pieces of equipment are currently being carried by a student. Next, in step 194, a listing of the equipment required for upcoming appointments is referenced.

In step 196, a comparison is made between the listing in step 194 and those pieces of equipment sensed in step 192 to determine which pieces of equipment are missing, or not currently being carried by the student. A missing piece of equipment is a piece of equipment required for an upcoming appointment that is not currently being carried by a student. If a piece of equipment is missing, a notification is sent to the student in step 198. This gives the student an opportunity to locate and retrieve the required piece of equipment before the appointment.

After the student has been notified of the missing equipment, or if the comparison determines that there is no missing equipment, the subroutine proceeds to step 200. In step 200, a similar comparison is made between the listing in step 194 and those pieces of equipment sensed in step 192 to determine excess pieces of equipment. Excess pieces are those pieces of equipment currently being carried by the student that are not required for upcoming appointments. If an excess piece of equipment is sensed, a notification is sent to the student in step 202. This gives the student an opportunity to discard equipment not necessary for upcoming appointments, in effect, "lightening the load" of equipment such as heavy books. After the student is notified of the excess equipment, or if the comparison determines that there is no excess equipment, the subroutine returns processing control.

Figure 7:
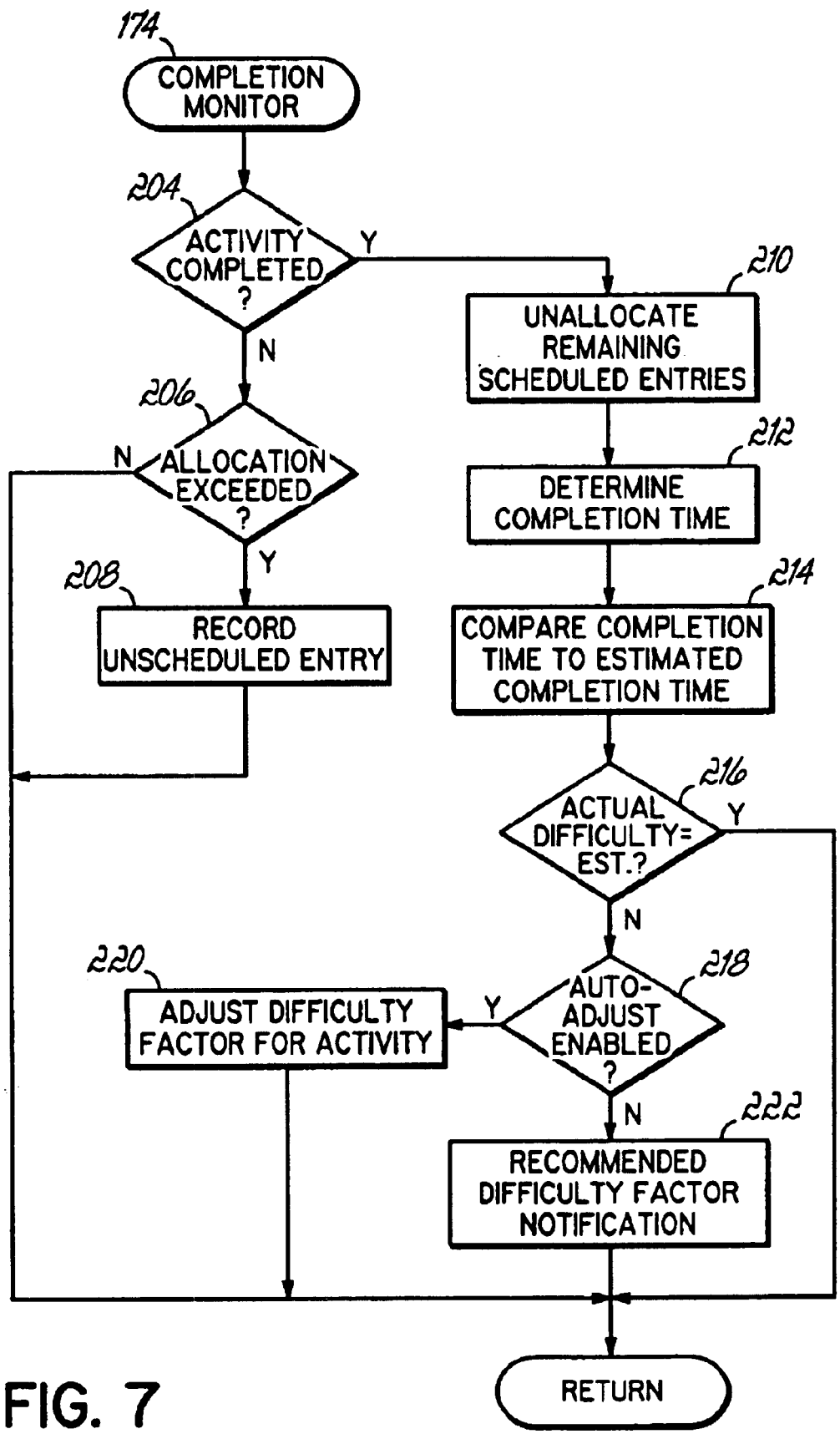
FIG. 7 is a flow chart illustrating the activities of an exemplary completion monitor subroutine, such as that used in the flow chart of FIG. 4.

Turning now to FIG. 7, an exemplary completion monitor subroutine is illustrated. The completion monitor subroutine 174 begins in step 204 by querying a student on whether an activity has been completed. Activities may include, but are not limited to, class appointments, individual appointments, assignments, practices, study sessions, and extracurricular activities.

If an activity has been completed, the subroutine 174 proceeds to step 210. In step 210, any time previously scheduled for the completed activity is unallocated. This frees up student time for other activities. Next, in step 212, the completion time is determined for the activity. The completion time is then compared to the estimated completion time for the activity in step 214.

Next, in step 216, the actual difficulty factor for the activity is compared to an estimated difficulty factor for the activity. The actual difficulty factor will have been downloaded from an educational institution. The estimated difficulty factor is based on the ratio of the completion time to the estimated completion time. If the actual difficulty factor equals the estimated difficulty factor, the subroutine returns process control. This indicates that a student is performing in accordance with time standards established for that activity by the educational institution.

However, if the estimated difficulty factor is either greater than or less than the actual difficulty factor, the subroutine 174 proceeds to step 218. Step 218 allows a student to select whether or not the subroutine automatically adjusts the estimated difficulty factor associated with a given activity in the future. If automatic adjustment is selected, the subroutine proceeds to step 220. Step 220 then makes the appropriate adjustment to the estimated difficulty factor for future activities.

For instance, on one hand, if the completion time exceeds the estimated completion time and therefore the estimated difficulty factor exceeds the actual difficulty factor, this indicates that a student is taking too much time completing that activity. This may mean that the student is not grasping the material and an increase in the amount of time allocated to this activity is appropriate. Conversely, if the time necessary to complete the activity was less than that estimated for doing so, the estimated difficulty factor will be less than the actual difficulty factor. This may mean that the student has an excellent understanding of the material and that a decrease in the amount of time allocated to this activity is appropriate.

On the other hand, if automatic adjustment of the estimated difficulty factor is not selected, the subroutine 174 proceeds to step 222. In step 222, a student is notified of a recommendation to either increase or decrease the estimated difficulty factor based on the ratio of the completion time to the estimated completion time and the subroutine returns process control. This makes students aware of their performance, though no further action is taken in the device.

Referring back to step 204, if an activity has not been completed, the subroutine 174 proceeds to step 206. In step 206, a determination is made as to whether the original time allocated for an activity has been exceeded. If so, a student is given the opportunity to schedule the additional time necessary as an unscheduled entry into a personal calendar, in step 208. This affords a student an ongoing opportunity to schedule additional time for completing activities. After any additional time has been scheduled, or if the original time allocated for that activity has not been exceeded, the subroutine returns processing control.

Figure 8:
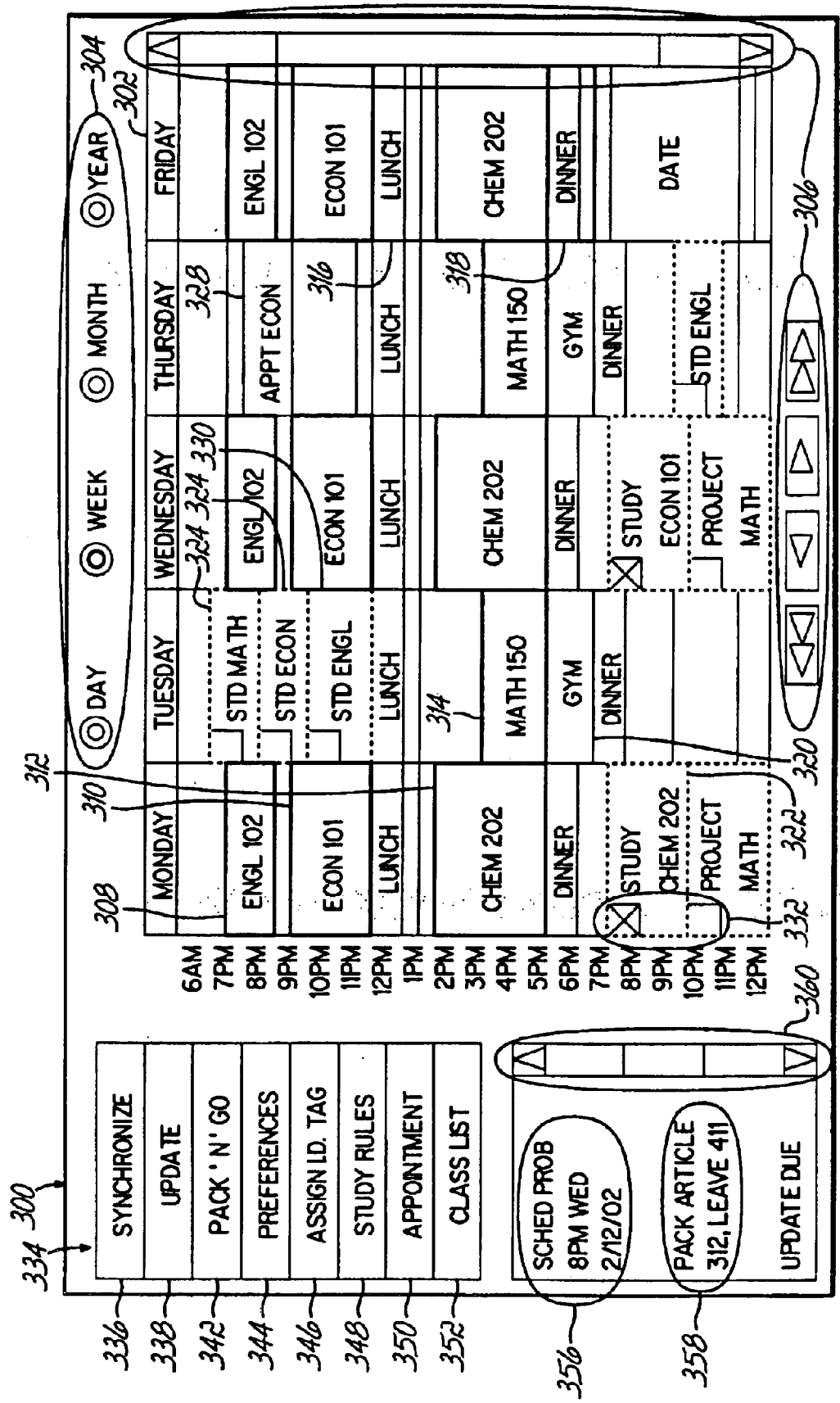
FIG. 8 is an illustration of a graphical user interface display consistent with the present invention.

Turning now to FIG. 8, a GUI display consistent with the present invention is illustrated. GUI display 300 provides a student with access to the functionality described hereinbefore. Those skilled in the art will appreciate that GUI display 300 is one of many possible GUI displays and that other displays providing similar functionality could be used without departing from the spirit of the invention.

Turning now to particulars of GUI display 300, a calender 302, such as a personal calender, is displayed. Calender 302 allows a student to view scheduled appointments and activities. As further illustrated, the display is set for a "week" view. However, a student may adjust the time period displayed using controls 304. A student may also scroll through the calender using controls 306. Programs capable of constructing and displaying a calender in the manner illustrated in FIG. 8 are well known in the art.

As further illustrated, class appointments for this particular student include: English 102 (308), Economics 101 (310), Chemistry 202 (312), and Mathematics 150 (314). The student has also made additional entries for lunch 316 and dinner 318. Appointments for gym 320, an extracurricular activity, have also been included. An individual appointment for Economics 101 (328) has also been set.

Study/Projects time blocks are also displayed. For example, study periods for Chemistry 202 (322), Math 150 (324), Economics 101(326), and English 102 (330), to name but a few, have been scheduled. As also illustrated, each study/project block contains a box 332 in which a student may place a check mark, indicating that the activity has been completed. Again, programs for managing a calender in the manner illustrated in FIG. 8 are well known in the art.

Turning to aspects of the present invention, a function list is provided. Function list 334 provides students with the ability to select functions such as: synchronizing 336, updating 338, pack 'n' go 342, entering preferences 344, assigning an ID tag to a piece of equipment 346, entering hierarchal study rules 348, scheduling an appointment 350, and maintaining a class list 352. The synchronizing function 336 accesses functionality such as that described in conjunction with FIG. 5. Similarly, the pack 'n' go function 342 accesses functionality such as that described in conjunction with FIG. 6 and the update function 338 accesses functionality such as that described in conjunction with FIG. 7.

A notification list is also illustrated. Notification list 354 provides an area for display of notifications generated through the functions contained in the function list 334. For example, a notification 356 generated from a schedule merge subroutine is illustrated. This notification 356 informs the student of a schedule problem at 8:00 p.m. on Wednesday, Feb. 2, 2002. A notification 358 generated from an ID tag check subroutine is similarly illustrated. This notification 358 informs the student that piece of equipment 312 is need for the next activity and that there is no need to take piece of equipment 411, as it is not needed. A student may scroll through the notification list 354 using controls 360. Programs for creating lists such as function list 334 and notification list 354 are well known in the art.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A portable organizer device comprising:
   a housing sized to be hand-held;
   a display within said housing sized to correspond to the palm of a hand; and
   circuitry within said housing implementing:
   a calendar database;
   a communication link configured to access an assignment record on an institutional system, the assignment record describing an assignment characterized by an estimated duration or a completion date;
   a user interface utilizing said display configured to receive a user schedule constraint;
   a sensor responsive to a unique identifying signal from an identification tag attachable to an article and operable to emit said unique identifying signal; and
   an agent configured to create a calendar entry for the accessed assignment record in response to the user schedule constraint, and the estimated duration or the completion date, and to initiate a notification on the user interface in response to said unique identifying signal.

2. The portable organizer device of claim 1, wherein the communication link is further configured to access an identification of an article required to perform the assignment, the agent further configured to associate the identification to the calendar entry.

3. The portable organizer device of claim 2, wherein the agent is further configured to initiate the notification in response to a comparison of said unique identifying signal and the article identification associated with the calendar entry.

4. The portable organizer device of claim 3, wherein the agent is further configured to initiate a missing article notification in response to not sensing said sensed unique identifying signal associated with the calendar entry.

5. The portable organizer of device of claim 3, wherein the agent is further configured to initiate an excess article notification in response to sensing another unique identifying signal having no association with the calendar entry.

6. The portable organizer device of claim 1, wherein the user schedule constraint identifies available time blocks in the calendar database.

7. The portable organizer of claim 6, wherein the agent is further configured to identity available time blocks by applying a hierarchical set of appointments rules.

8. The portable organizer of claim 7, wherein the agent is configured to respond to the hierarchical set of appointment rules from a group consisting of a minimum start time, a maximum end time, an earliest start date, a latest start date, a shortest session duration time, and a longest session duration time.

9. The portable organizer of claim 6, wherein the assignment record includes an estimated completion time, and the agent is further configured to adjust the estimated completion time in response to a stored difficulty factor.

10. The portable organizer of claim 6, wherein the agent is further configured to enter a plurality of calendar entries to complete the assignment.

11. The portable organizer of claim 10, wherein the agent is further configured to unallocate a later calendar entry of the plurality of calender entries in response to completion of the assignment record.

12. The portable organizer of claim 10, wherein the agent is further configured to allocate an additional calendar entry associated with the assignment record in response to a failure to complete the assignment record.

13. A portable organizer device comprising:
a housing sized to be hand held;
a display in said housing sized to correspond to the palm of a hand; and
circuitry within said housing implementing:
a calendar database;
a communication link configured to access and assignment record on an institutional system, the assignment record describing an assignment characterized by a difficulty factor and an estimated duration or a completion date;
a user interface utilizing said display configured to receive a user schedule constraint;
a sensor responsive to a unique identifying signal from an identification tag attachable to an article and operable to emit said unique identifying signal; and,
an agent configured to create a calender entry for the accessed assignment record in response to the user schedule constraint, and the estimated duration or the completion date; to initiate a notification on the user interface in response to said unique identifying signal; and to monitor duration of completion of the assignment and to correspondingly adjust the stored difficulty factor.

14. A method of updating a calendar database, comprising:
providing a portable organizer comprising a housing sized to be hand held, a display in said housing sized to correspond to the palm of a hand, and circuitry within said housing, the portable organizer being used in:
accessing an assignment record on an institutional system, the assignment record describing an assignment characterized by an estimated duration or a completion date;
receiving a user schedule constraint utilizing said display;
sensing a unique identifying signal from an identification tag attachable to an article and operable to emit said unique identifying signal;
notifying a user in response to sensing said unique identifying signal, and
creating a calendar entry for the accessed assignment record in response to the user schedule constraint, and the estimated duration or the completion date.

15. The method of claim 14, further comprising:
accessing an identification associated with the assignment record of at least one article required to perform the assignment; and
associating the identification to the calendar entry.

16. The method of claim 15, wherein notifying the user in response to sensing the unique identifying signal is further in response to comparison of the article identification associated with the calendar entry and the unique identifying signal.

17. The method of updating and entry in a calendar database of claim 14, further comprising:
associating said unique identifying signal with an entry in said calendar database.

18. An educational scheduling system, comprising:
an institutional system containing an assignment record on an institutional system, the assignment record describing an assignment characterized by an estimated duration or a completion date; and
a portable organizer device comprising:
a housing sized to be hand held;
a display in said housing sized to correspond to the palm of a hand;
a sensor responsive to a unique identifying signal from an identification tag attachable to an article and operable to emit said unique identifying signal; and
circuitry in said housing implementing:
a calendar database;
a communication link configured to access the assignment record on the institutional system;
a user interface utilizing said display configured to receive a user schedule constraint and notify a user in response to sensing said unique identifying signal; and
an agent configured to create a calendar entry for the accessed assignment record in response to the user schedule constraint, and the estimated duration or the completion date.

19. The educational scheduling system of claim 18, wherein the communication link is further configured to upload to the institutional system a status message pertaining to the calendar entry.

* * * * *